United States Patent
Maeda et al.

(10) Patent No.: US 6,301,018 B1
(45) Date of Patent: Oct. 9, 2001

(54) COMMUNICATION APPARATUS THAT COMBINES PLURAL IMAGES INTO ONE PAGE FOR TRANSMISSION

(75) Inventors: Toru Maeda, Mitaka; Hitoshi Saito, Yokohama; Masanori Momose, Tokyo; Toru Fujino, Urawa; Shinichiro Kohri; Makoto Kobayashi, both of Kawasaki; Kazuhiro Sugawara, Tokyo; Satoshi Imai, Koganei; Naomi Nakamura, Kawaguchi; Yasushi Morimoto, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/724,479

(22) Filed: Oct. 1, 1996

(30) Foreign Application Priority Data

Oct. 2, 1995 (JP) .................................................. 7-276160
Oct. 2, 1995 (JP) .................................................. 7-276161

(51) Int. Cl.$^7$ ........................................................ H04N 1/23
(52) U.S. Cl. ........................................... 358/449; 358/450
(58) Field of Search ................................. 358/449–452; 382/284, 298

(56) References Cited

U.S. PATENT DOCUMENTS

| | | | | |
|---|---|---|---|---|
| 5,191,429 | * | 3/1993 | Rourke ................................. | 358/296 |
| 5,467,203 | * | 11/1995 | Kawata ................................. | 358/451 |
| 5,585,936 | * | 12/1996 | Eto et al. ............................. | 358/450 |
| 5,654,807 | * | 8/1997 | Miyaza ................................. | 358/450 |
| 6,088,131 | * | 10/2000 | Imai et al. ........................... | 358/450 |
| 6,130,965 | * | 10/2000 | Kobayashi et al. ................... | 382/284 |

OTHER PUBLICATIONS

Fishman et al. The Book of Fax, Ventana Press, Inc, pp. 38–39.*

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

A communication apparatus capable of transmitting image data in a form capable of reducing a running cost is provided. When a plurality of pages of image data to be transmitted can be recorded on one record sheet at a receiving station, a plurality of pages of image data are combined into one page of image data for transmission within a range in which the image data are recorded on one sheet at the receiving station and in such a manner that the plurality of pages of image data are recorded on the record sheet in vertically evenly divided areas. When a plurality of pages of image data to be transmitted can be recorded on one record sheet at the receiving station, main scan lengths of the plurality of pages of image data are made equal and the plurality of pages of image data are combined into one page of image data for transmission within a range in which the image data are recorded on one record sheet at the receiving station and in such a manner that the image data are recorded on the record sheet in evenly divided areas.

21 Claims, 7 Drawing Sheets

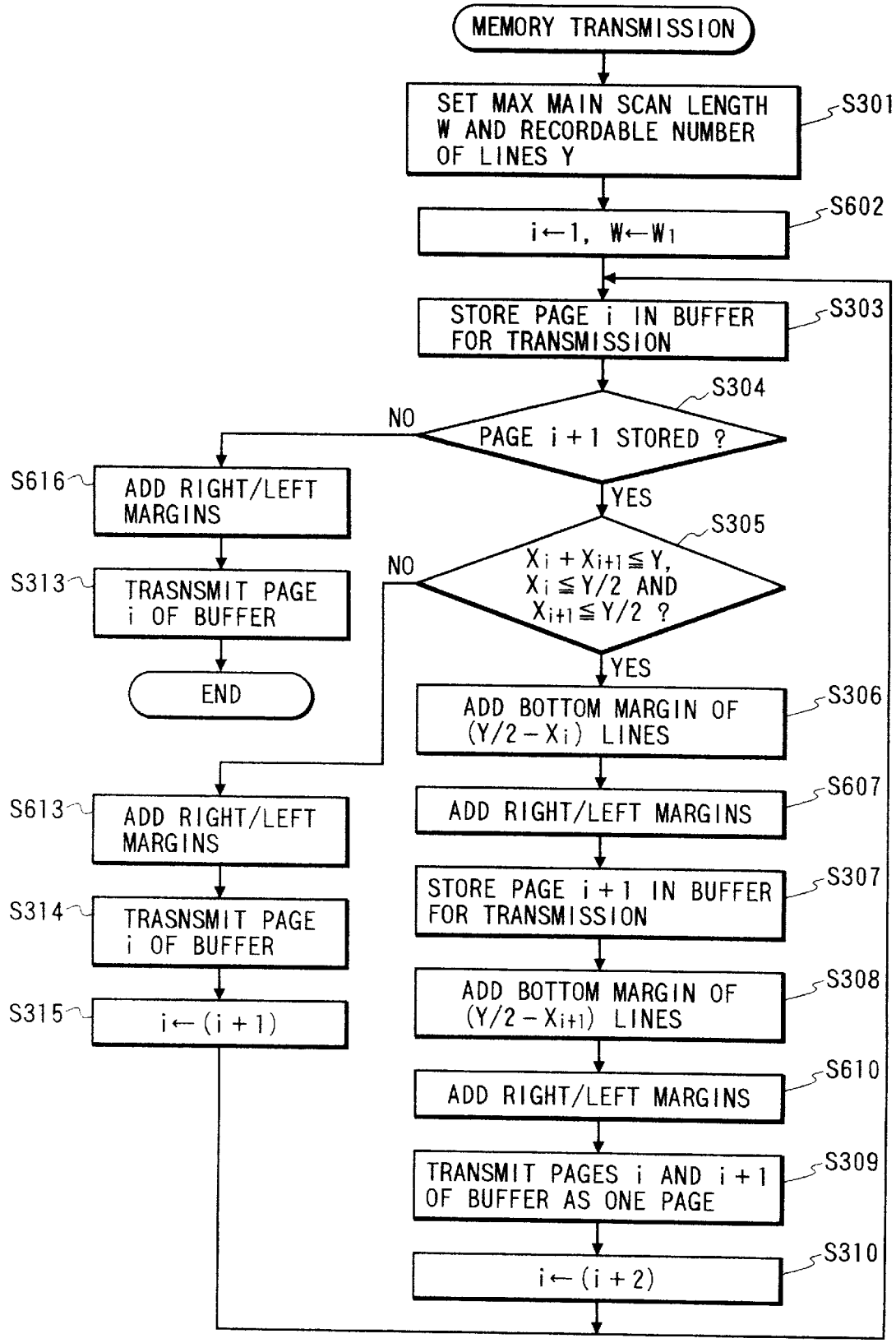

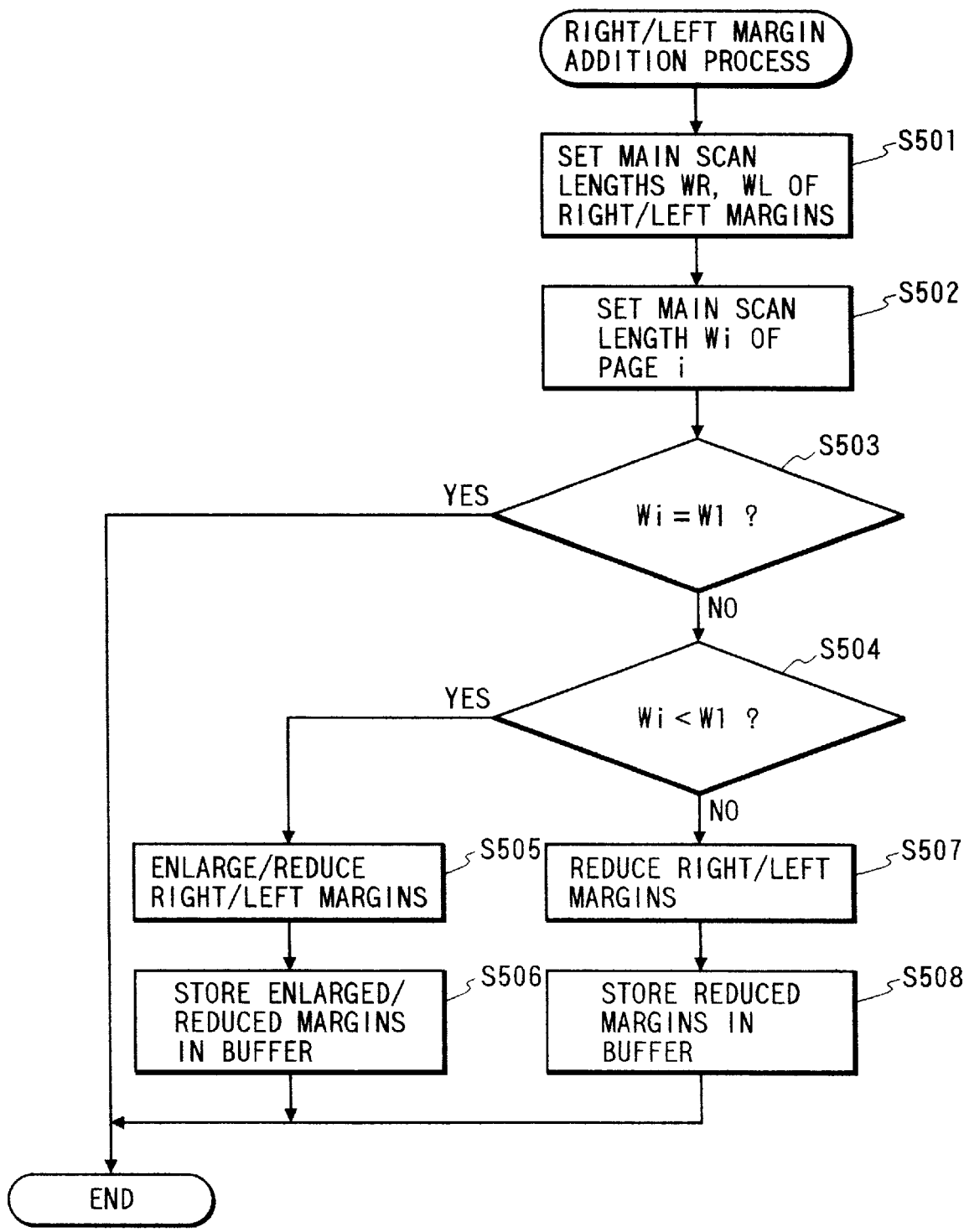

COMMUNICATION APPARATUS THAT COMBINES PLURAL IMAGES INTO ONE PAGE FOR TRANSMISSION

BACKGROUND OF THE INVENTION

1. Field of the Invention

The present invention relates to a communication apparatus and communication method, and more particularly to a facsimile apparatus and facsimile transmission system having a memory transmission function to temporarily store input image data in a memory and then transmit it.

2. Related Background Art

In the past, a facsimile apparatus having a memory transmission function of temporarily storing read image data in a memory and then transmitting it has been known. In this type of facsimile apparatus, when image data of a plurality of document sheets stored in the memory is to be transmitted, the image data read from one document sheet is transmitted as one page of image data without regard to a length along a sub-scan direction of the image data of each document sheet As a result, even if the length along the sub-scan direction of the document sheet is short and the number of read lines is small, the image is transmitted as one page of image data, and where a receiving station uses cut sheets as record sheets, the image is recorded only at a top portion of the record sheet (cut sheet) and a large blank area is left at a bottom portion. This causes not only the waste of the record sheet, but also the failure that extra feeding of the sheet by the blank area is required when a plurality of received pages of image data are to be recorded. Thus, the rapidity of the recording is lost and a running cost increases

SUMMARY OF THE INVENTION

It is an object of the present invention to improve a communication apparatus.

It is another object of the present invention to improve a facsimile apparatus.

It is still another object of the present invention to provide a facsimile apparatus which can transmit image data in a form capable of reducing a running cost.

BRIEF DESCRIPTION OF THE DRAWINGS

FIG. 6 shows a flow chart illustrating a memory transmission operation in the Embodiment 2 of the present invention; and FIG. 7 shows a flow chart illustrating a left and right margin data addition process in the transmission operation.

DETAILED DESCRIPTION OF THE PREFERRED EMBODIMENTS

[Embodiment 1]

Referring to FIGS. 1 to 4, an embodiment of the present invention is explained.

Figure 1:
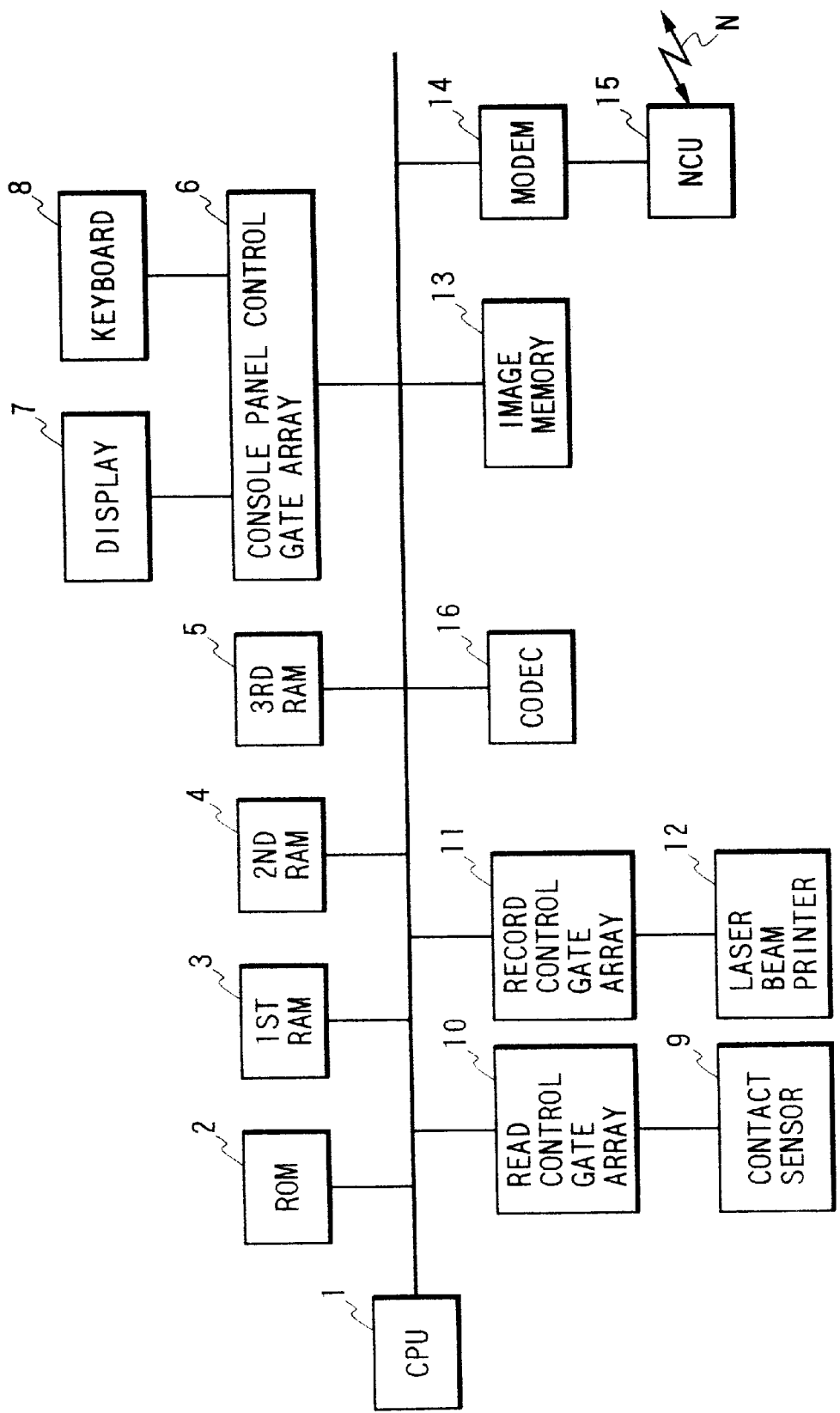
FIG. 1 shows a block diagram of a configuration of a facsimile apparatus in accordance with Embodiments 1 and 2 of the present invention.

FIG. 1 shows a block diagram of a configuration of a facsimile apparatus in accordance with Embodiment 1 of the present invention.

The present facsimile apparatus performs various processes relating to the facsimile transmission primarily by a CPU (central processing unit) 1. Connected to the CPU 1 are a ROM (read-only memory) 2, first, second and third RAMs (random access memories) 3, 4 and 5, a console panel control gate array 6, a read control gate array 10, a record control gate array 11, an image memory 13, a modem 14 and a coder/decoder (codec) 16. While not shown, the codec 16 comprises an encoder, a multiplexor, a demultiplexor and a decoder.

A display 7 and a keyboard 8 are connected to the console panel gate array 6, a contact sensor is connected to the read control gate array 10, a laser beam printer 12 is connected to the record control gate array 11 and an NCU (network control unit) 15 is connected to the modem 14.

Figure 3:
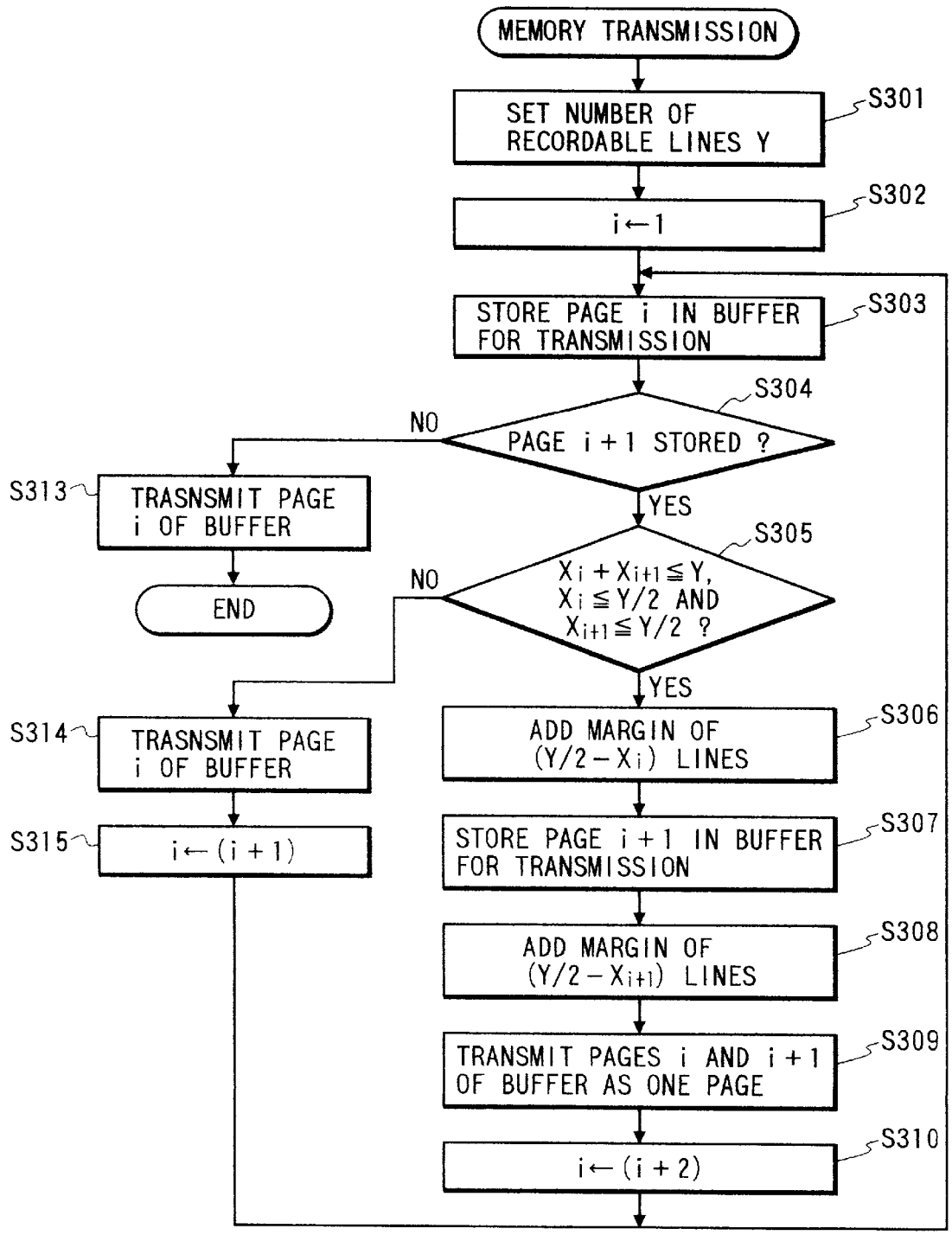
FIG. 3 shows a flow chart of the memory transmission operation in the Embodiment of the present invention.
Figure 4:
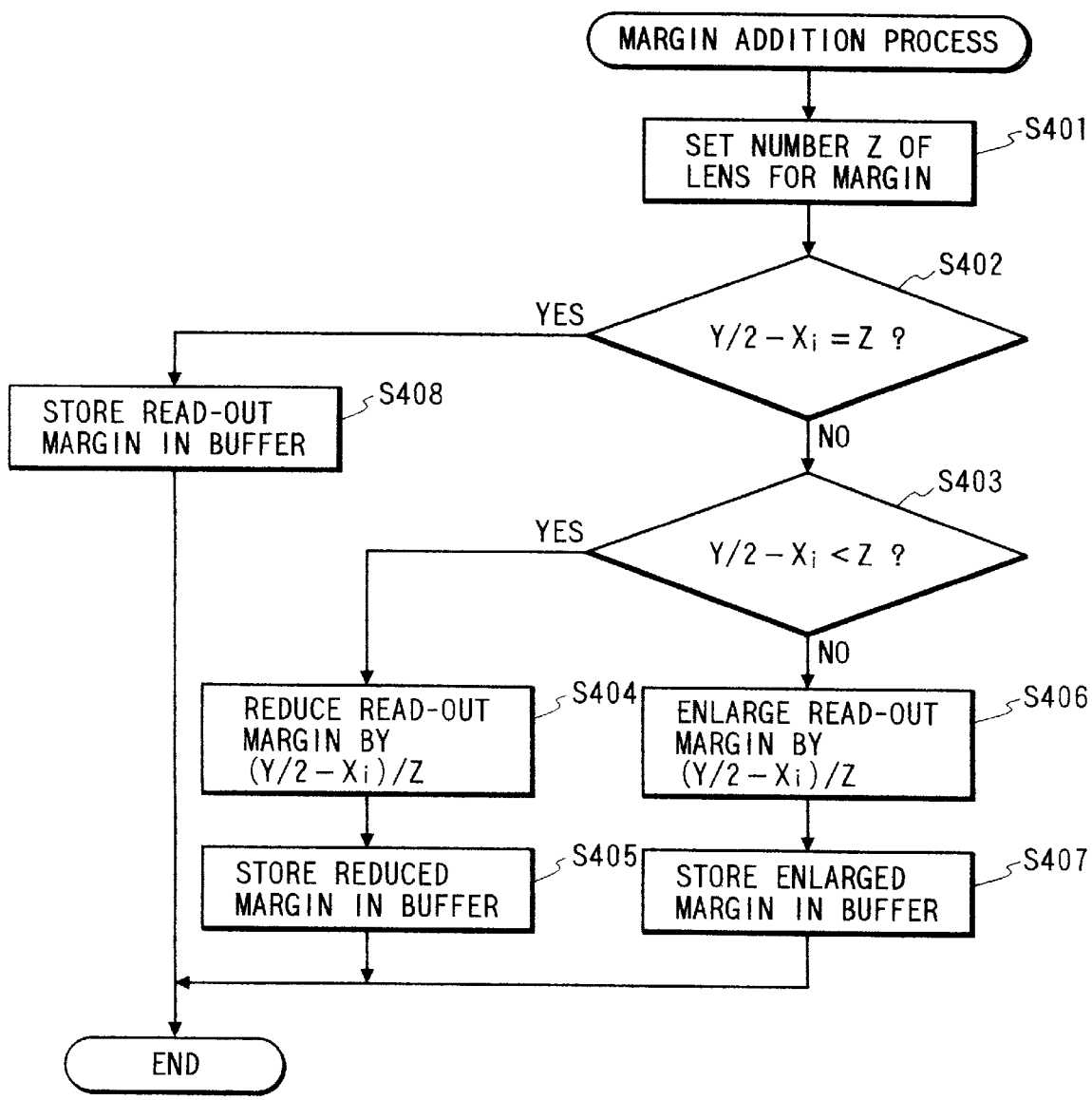
FIG. 4 shows a flow chart illustrating a margin image data addition process in the transmission operation of FIG. 3.

The CPU 1 executes the ITU-T Recommendation binary code control protocol and various processes corresponding to flow charts shown in FIGS. 3 and 4 while it controls other constituent units in accordance with various programs stored in the ROM 2. The CPU 1 uses the first RAM 3 as a work area. The ROM 2 stores a plurality of types of margin image data of different sizes as will be described later.

The contact sensor 9 comprises a photoelectric conversion device such as a CCD and converts a document sheet image optically read under control of the read control gate array 10 to an electrical signal to output it as image data The read control array 10 compression-codes the image data read by the contact sensor 9 and stores it in the image memory 13 comprising a DRAM.

As management information for the image data stored in the image memory 13, an accept number, address information, the number of pages, stored image memory block information, a resolution, an image size and the number of read lines of each page are stored in the second RAM 4 under control of the CPU 1. When the image data is compression-coded, the read gate array 10 recognizes the number of read lines and outputs it.

When the image data stored in the image memory 13 is to be transmitted, the image data is coded and compressed in accordance with a mode of a facsimile apparatus of a destination station by the encoder in the codec 16 under control of the CPU 1, and it is further modulated by the modem 14 and outputted to a line N through the network control unit 15. When the image data is transmitted, the management information for the image data is also read from the second RAM 4 for the simultaneous transmission, and it is multiplexed by the multiplexor in the codec 16 for transmission.

The image memory 13 stores the read image data read by the contact sensor 9, the transmission image data to be transmitted, the received image data and the record image data to be recorded and comprises a read buffer area, a transmission buffer area, a reception buffer area and a record buffer area for storing those image data.

On the other hand, the image data received through the line N and the network control unit 15 is demodulated by the modem 14 and error-checked and corrected under control of the CPU 1, and it is decoded and decompressed by the decoder in the codec 16 and stored in the image memory 13, and then it is printed out by the laser beam printer 12 under control of the record control gate array 11. The management information received together with the image data is demultiplexed by the demultiplexor in the codec 16 and stored in the second RAM 4, and then it is printed out by the laser beam printer 12.

While not shown, arranged on the keyboard 8 are a ten-key for entering the address information (FAX number), and various function keys such as a resolution setting key for setting fine/super fine resolution, a start key for commanding the start of transmission, a completion mark key for stamping a completion mark indicating the completion of transmission of the transmission document sheet and a designation key for specifying margin image data. A status of the operation of those keys is detected by the console panel control gate array 6 and the corresponding input information, setting information and commands are stored in the third RAM 5 under control of the CPU 1.

The display 7 comprises a liquid crystal display, and information for the operation key of the keyboard 8 and clock information are displayed by the console panel control gate array 6 under control of the CPU 1.

Figure 2:
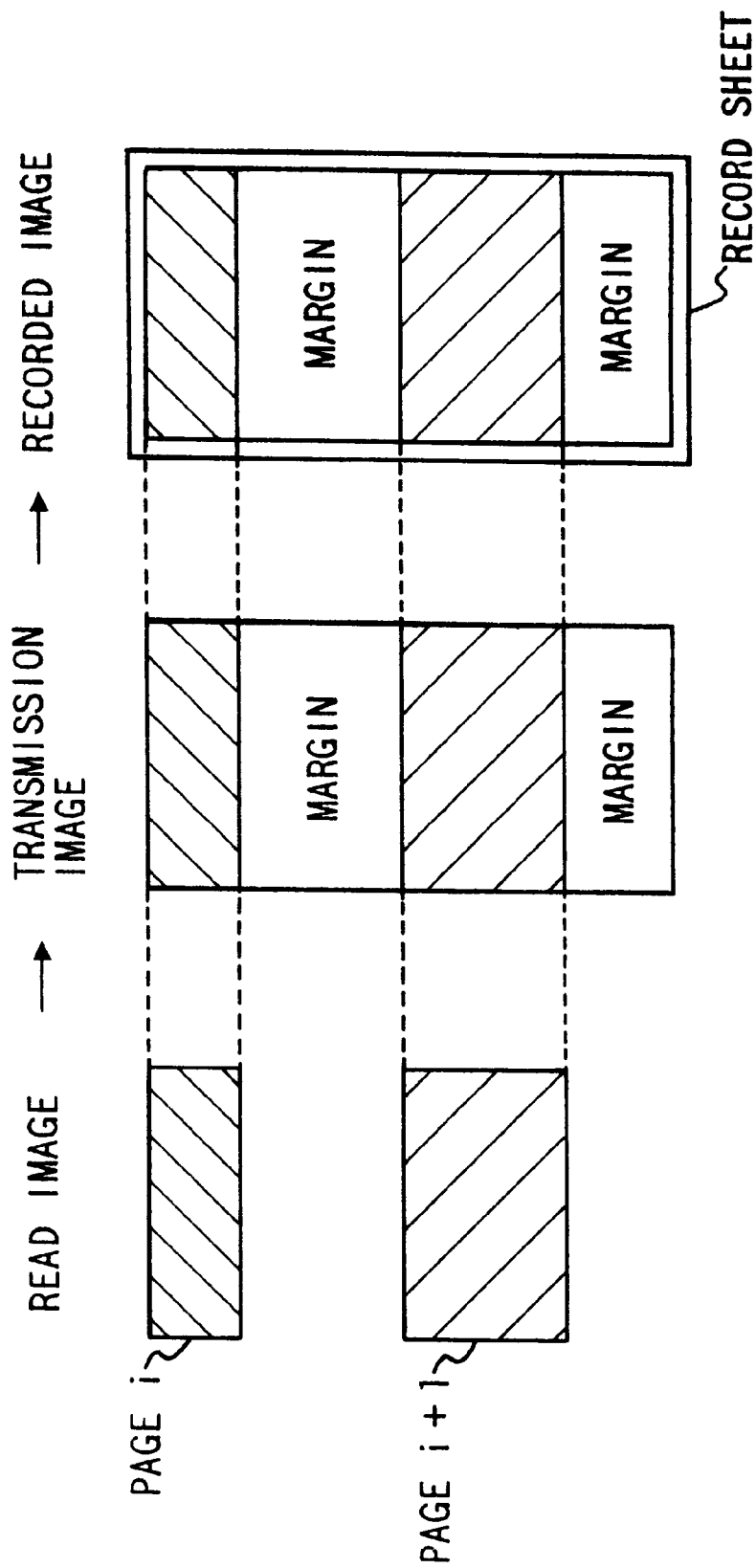
FIG. 2 shows a conceptual view illustrating page management in a memory transmission mode in the Embodiment 1 of the present invention.

With those constituent units, the facsimile apparatus of the present embodiment conducts the memory transmission as shown in FIG. 2. In the present embodiment, when the read image data is temporarily stored in the image memory 13 and transmitted by the accept number, a plurality of pages of image data are combined into one page of image data for transmission within a range that does not exceed exceeds the number of recordable lines of the facsimile apparatus at the receiving station, as shown in FIG. 2.

In this case, margin image data is added at the bottom portion of the image data of each of a plurality of continuous pages such that the image data is recorded on a vertically equally devided area of a record sheet (cut sheet).

In the present embodiment, the facsimile transmission/reception is conducted by a signal sequence in accordance with the binary code control protocol of the ITU-T Recommendation.

Referring to flow charts of FIGS. 3 and 4, the memory transmission operation in the present embodiment is explained. In this flow, it is assumed that a read document sheet width (a main scan length of the read image data) and a resolution are the same for all pages.

The CPU 1 first determines and sets a maximum recordable main scan length W and the number of recordable lines Y by taking a DIS, (digital initial identification signal) including a size of a record sheet and a resolution at the destination station derived from the facsimile apparatus of the transmission destination station by the execution of the signal sequence in accordance with the binary code control protocol, into consideration (step S301 in FIG. 3). For example, if the read document sheet size is A4 size, the record sheet width at the receiving station is A4 size and the read resolution is standard, "1728" and "1144" are set as the maximum recordable main scan length W and the number of recordable lines Y, respectively, for the recording at the standard resolution on the A4 size record sheet.

Then, "1" is set to a page counter i as a page number (step S302). The image data of the page having the number indicated by the page counter i (hereinafter referred to as i) is read from the image data stored in the read buffer of the image memory 13 and it is stored in the transmission buffer (arranged in the image memory 13) (step S303).

Whether the image data of the next page, that is, page (i+1) is stored in the image memory 13 or not is determined (step S304). If the image data of the page (i+1) is stored in the image memory, whether a sum $(x_i + X_{i+1})$ of the number of read lines $X_i$ of the page i and the number of read lines $X_{i+1}$ of the page (i+1) is not larger than the number of recordable lines Y and each of the number of read lines $X_i$ of the page i and the number of read lines $X_{i+1}$ of the page (i+1) is not larger than ½ of the number of recordable lines Y is determined (step S305).

If the above condition is met, blank image data of $Y/2 - x_i$ lines (namely, the number of lines of a half size of the record sheet less the number of lines of the image data) is added to the bottom portion of the image data of the page i (step S306). The image data of the page (i+1) is read and stored in the transmission buffer (step S307). Then, margin image data of $Y/2 - X_{i+1}$ lines (namely, the number of lines of a half size of the record sheet less the number of lines of the image data) is added to the bottom portion of the image data of the page (i+1) as it was for the page i. Details of the addition process of the margin image data will be explained with reference to a flow chart of FIG. 4.

Then, the image data in the transmission buffer, that is, the image data of the page i and the page (i+1) (including the margin image data added to the bottom portions of the respective pages) are transmitted as one page of image data (step S309). The page counter i is incremented by "2" (step S310) and the process returns to the step S303.

In the step S305, if it is determined that the above condition is not met, the image data in the transmission buffer, that is, the image data of the page i is transmitted as one page of image data in a conventional manner (step S314). Then, the page counter i is incremented by "1" (step S315) and the process returns to the step S303.

In the step S304, if it is determined that the next page, that is, the page (i+1) is not stored, it indicates that the page i is the final page of one communication and the image data of the page i in the transmission buffer is transmitted (step S313) and the process is terminated.

Referring to the flow chart of FIG. 4, the detail of the margin image data addition process in the steps S306 and S308 is explained First, the number of lines Z of the margin image data in the ROM 2 designated by the operation of the keyboard 8 is set (step S401). Then, whether $Y/2 - X_i$=the number of lines Z of the designated margin image data or not (or when it is added to the image data of the page (i+1), whether $Y/2 - X_{i+1}$=the number of lines Z of the designated margin image data or not), that is, whether the sum of the number of lines of the image data and the number of lines Z of the designated margin image data is equal to ½ of the number of lines (the number of recordable lines Y) of the record sheet or not is determined (step S402).

If they are not equal, whether $Y/2 - X_i$<the number of lines Z of the designated margin image data or not (or when it is added to the image data of the page (i+1), whether $Y/2 - x_{i+1}$<the number of lines Z of the designated margin image data or not), that is, whether the sum of the image data of the page i or (i+1) and the margin image data exceeds ½ of the number of lines (the number of recordable lines Y) of the record sheet or not if the designated margin image data is added as it is, is determined (step S403).

If the sum exceeds, the designated margin image data having the number of lines Z is read from the ROM 2 and the reduction process of $(Y/2 - x_i)/Z$ (or when it is added to the image data of the page (i+1), the reduction process of $(Y/2 - x_{i+1})/Z$) is conducted to the margin image data read from the ROM 2 in order to make the sum of the image data of the page i or the page (i+1) and the margin image data equal to ½ of the number of lines of the record sheet (step S404). The reduced margin image data is stored in the transmission buffer (step S405) and the process is terminated On the other hand, if the sum does not exceed, the designated image data having the number of lines Z is read from the ROM 2 and the enlarge process of $(Y/2 - x_i)/Z$ (or when it is added to the image data of the page (i+1), the enlarge process of $(Y/2 - X_{i+1})$) is conducted for the margin image data read from the ROM 2 in order to make the sum of the image data of the page i or the page (i+1) and the margin image data equal to ½ of the number of lines of the record sheet (step S406). The enlarged margin image data is stored in the transmission buffer (step S407) and the process is terminated.

In the step S402, if it is determined that the sum of the number of lines of the image data and the number of lines Z of the designated margin image data is equal to ½ of the number of lines (the number of recordable lines Y) of the record sheet, the designated margin image data having the number of lines Z is read from the ROM 2 and it is stored in the transmission buffer without conducting the reduction process or the enlarge process (step S408), and the process is terminated When the margin data is to be added, a lateral width of the margin image data to be added is rendered to be equal to a main scan length of the input image data, as shown in FIG. 2.

As described above, according to the present embodiment, when two pages of image data to be transmitted can be recorded on one record sheet at the receiving station, the transmitting station transmits the two pages of image data as one page of image data so that the margin area of the record sheet is minimized, the extra sheet feed by the margin area is not necessary, rapid recording is attained and the running cost is reduced. Further, when the two pages of image data are transmitted as one page of image data, the bottom margin image data is added such that the image data is recorded at a vertically center area. Thus, the recorded image data is easy to read and any misrecognition of the margin area as information is avoided.

The present invention is not limited to the above embodiment. For example, three or more pages of image data may be transmitted as one page of image data. The same transmission control may be applied to not only the input image data read by the CCD scanner but also image data inputted by a computer. For the margin image data addition process, the pre-stored margin image data may be used or it may be generated as required. Instead of reducing the margin image data for addition, the image data of the size corresponding to the reduced size may be extracted and added.

[Embodiment 2]

Referring to FIGS. 5 to 8, an operation of the Embodiment 2 is now explained.

A block diagram of the facsimile apparatus of the Embodiment 2 is identical to the block diagram of FIG. 1 explained in the Embodiment 1 and the explanation thereof is omitted.

In FIGS. 6 and 7, the same processes as those of the Embodiment 1 are designated by the same numerals and the explanation thereof is omitted.

Figure 5:
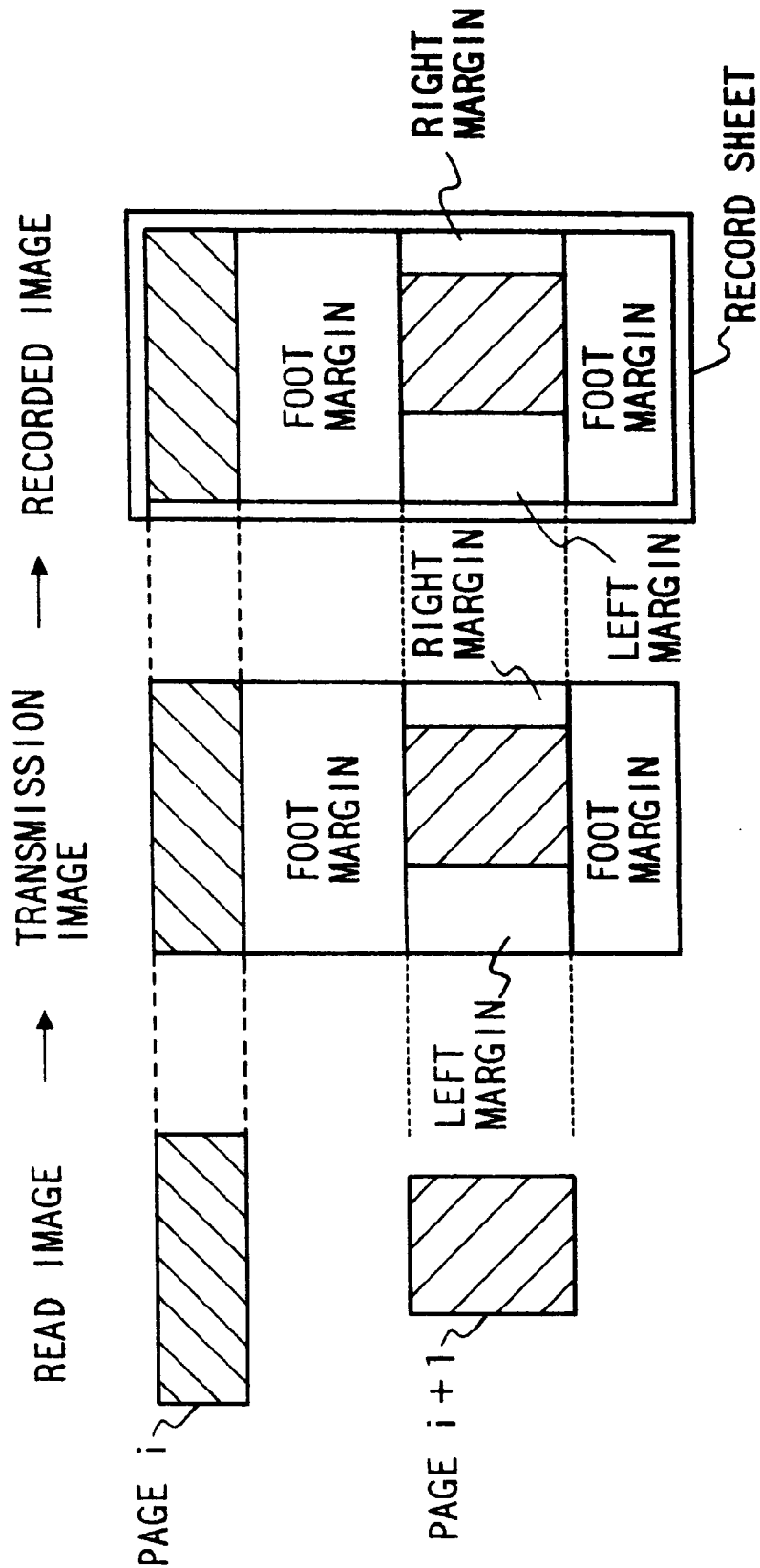
FIG. 5 shows a conceptual view illustrating page management in the memory transmission mode in the Embodiment 2 of the present invention.

With the constituent units shown in FIG. 1, the facsimile apparatus of the present embodiment conducts the memory transmission as shown in FIG. 5. That is, in this embodiment, when the read image data is temporarily stored in the image memory 13 and transmitted by the accept number, a plurality of pages of image data are combined into one page of image data for transmission within a range that does not exceed the number of recordable lines of the facsimile apparatus at the receiving station, as shown in FIG. 5.

In this case, when main scan lengths of a plurality of continuous pages of image data are different, left and right margin image data are added to make the main scan lengths equal and bottom margin image data is added such that the image data of each of the plurality of continuous pages is recorded on a divided area of a record sheet (cut sheet).

In the present embodiment, the facsimile transmission/reception is conducted by a signal sequence in accordance with the binary code control protocol of the ITU-T Recommendation 30.

Referring to flow charts of FIGS. 6 and 7, the memory transmission operation in the present embodiment is explained. In this flow, it is assumed that a resolution is the same for all pages.

"1" is initially set to a page counter i as a page number and a main scan length $W_1$ of the image data of the page 1 of a plurality of image data corresponding to the accept number is set as a maximum recordable main scan length W (step S602). The image data of the page having the number indicated by the page counter i (hereinafter referred to as i) is read from the image data stored in the read buffer of the image memory 13 and it is stored in the transmission buffer (arranged in the image memory 13) (step S303).

If the condition of the step S305 is met, bottom margin image data of $Y/2-X_i$ lines (namely, the number of lines of a half size of the record sheet less the number of lines of the image data) is added to the image data of the page i (step S306) and the left and right margin image data are also added (step S607). The image data of the page (i+1) is read and stored in the transmission buffer (step S307). Then, bottom margin image data of $Y/2-X_{i+1}$ lines (namely, the number of lines of a half size of the record sheet less the number of lines of the image data) is added to the image data of the page (i+1) as it was for the page i (step S308) and the left and right margin image data are also added (step S610). Detail of the addition process of the left and right margin image data will be explained with reference to a flow chart of FIG. 7.

Then, the image data in the transmission buffer, that is, the image data of the page i and the page (i+1) (including the bottom margin image data and the left and right margin image data added to the respective pages) are transmitted as one page of image data (step S309). The page counter i is incremented by "2" (step S310) and the process returns to the step S303.

If it is determined that the condition of the step S305 is not met, the left and right margin image data addition process is conducted for the image data of the page i (step S613). Then, the image data in the transmission buffer, that is, the image data of the page i (including the left and right margin image data) is transmitted as one page of image data in a conventional manner (step S314). Then, the page counter i is incremented by "1" (step S315) and the process returns to the step S303.

In the step S304, if it is determined that the next page, that is, the page (i+1) is not stored, it indicates that the page i is the final page of one communication and only the left and right margin image data addition process is conducted for the image data of the page i (step S616). Then, the image data (including the left and right margin image data) in the transmission buffer is transmitted (step S313) and the process is terminated.

The details of the bottom margin image data addition process in the steps S306 and S308 are same as those shown in the flow chart of FIG. 4 and the explanation thereof is omitted.

Referring to a flow chart of FIG. 7, the details of the left and right margin image data addition process in the steps S607, S610, S613 and S616 are explained.

First, left and right margin image data main scan lengths WL and WR in the ROM 2 designated by the operation of the keyboard 8 are set (step S501), and an image data main scan length $W_i$ of the page i (or when it is added to the image data of the page (i+1), an image data main scan length $W_{i+1}$ of the page (i+1)) is set (step S502).

Then, whether the image data main scan length $W_i$ of the page i (or when it is added to the image data of the page (i+1), the image data main scan length $W_{i+1}$ of the page (i+1)) is equal to the image data main scan length $W_1$ of the page 1 or not is determined (step S503). If they are not equal, whether the image data main scan length $W_i$ of the page i (or when it is added to the image data of the page (i+1), the image data main scan length $W_{i+1}$ of the page (i+1)) is shorter than the image data main scan length $W_1$ of the page 1 or not is determined (step S504).

If it is shorter, the left and right margin image data of the main scan lengths WL and WR are read from the ROM 2 and the read left and right margin image data are reduced or enlarged such that a sum of the main scan lengths WL' and WR' after the addition of the left and right margin image data and the image data main scan length $W_i$ of the page i (or when it is added to the image data of the page (i+1), the image data main scan length $W_{i+1}$ of the page (i+1)) is equal to the image data main scan length of the page 1 and the number of lines after the addition of the left and right image data is equal to the number of lines of the image data (step S505). The left and right margin image data is stored in the transmission buffer to add it to the image data of the page 1 (or when it is added to the image data of the page (i+1), the image data of the page (i+1)) (step S506), and the process is terminated When the left and right margin image data are to be added, the margin image data main scan lengths WL' and WR' after the addition may be different from each other as shown in FIG. 2 or they may be equal.

On the other hand, if the image data main scan length $W_i$ of the page i (or when it is added to the image data of the page (i+1), the image data main scan length $W_{i+1}$ of the page (i+1)) is longer than the image data main scan length $W_1$ of the page 1, the image data of the page i (or when it is processed for the image data of the page (i+1), the image data of the page (i+1)) is read from the transmission buffer, and the image data is reduced (step S507) such that the main scan length $W_i$ or $W_{i+1}$ is equal to the main scan length $W_1$ of the page 1 while the number of lines of the image data is kept unchanged, and it is stored in the transmission buffer (step S508) and the process is terminated.

In the step S503, if it is determined that the image data main scan length $W_i$ of the page i (or when it is processed for the image data of the page (i+1), the image data main scan length $W_{i+1}$ of the page (i+1)) is equal to the image data main scan length $W_1$ of the page 1, the above steps S504 to S508 are skipped and the process is terminated.

In the Embodiment 2, the main scan lengths are matched to the main scan length $W_1$ of the page 1 but the widths (main scan lengths) of the respective pages may be matched to the top page main scan length $W_i$ of a plurality of pages to be combined.

As described above, according to the present embodiment, when two pages of image data to be transmitted can be recorded on one record sheet at the receiving station, the transmitting station transmits the two pages of image data as one page of image data so that the margin area of the record sheet is minimized, the extra sheet feed by the margin area is not necessary, rapid recording is attained and the running cost is reduced. Further, when the two pages of image data are transmitted as one page of image data, the bottom margin image data is added such that the image data is recorded at a vertically center area. Thus, the recorded image data is easy to read. Further since the left and right margin image data are added such that the main scan length coincides with the image data of the page 1, any misrecognition of the margin area as information is avoided.

The present invention is not limited to the above embodiment. For example, three or more pages of image data may be transmitted as one page of image data. The same transmission control may be applied to not only the input image data read by the CCD scanner but also image data inputted by a computer. For the bottom margin image data addition process and the left and right margin image data addition process, the margin image data may be generated as required rather than pre-storing the image data. Instead of reducing the margin image data for addition, the image data of the size corresponding to the reduced size may be extracted and added.

When a plurality of pages of image data are combined for transmission, either the main scan lengths may be made equal or the recording may be made such that the center lines of the image data of the respective pages coincide with the center lines of the record sheets. The image data which is the reference to make the main scan lengths equal need not be the image data of the page 1 but it may be the longest main scan length of one communication of image data.

What is claimed is:

1. A communication apparatus comprising:
   first recognition means for recognizing an input size for each input page of a plurality of input pages of image data inputted by image input means, wherein the respective input sizes of at least two of the input pages are different from each other;
   second recognition means for recognizing a record sheet size of a record sheet at a transmission destination terminal; and
   transmission means for combining a plural number of the input pages into one transmission page of image data for transmission in accordance with the respective input sizes recognized by said first recognition means and the record sheet size recognized by said second recognition means, wherein the number of input pages to be combined includes at least two input pages having different input sizes,
   said transmission means combining the number of input pages such that each of the number of input pages is recorded in a respective one of plural areas on a single record sheet, wherein an area size of each of the areas corresponds to a total record area determined by the record sheet size divided by the number of input pages to be combined.

2. A communication apparatus according to claim 1, wherein said transmission means combines two consecutive input pages into one transmission page of image data for transmission within a range in which a total image data size after combination does not exceed the record sheet size recognized by said second recognition means.

3. A communication apparatus according to claim 1, wherein said transmission means combines three or more consecutive input pages into one transmission page of image data for transmission within a range in which a total image data size after combination does not exceed the record sheet size recognized by said second recognition means.

4. A communication apparatus according to claim 1, wherein said transmission means adds margin image data at a bottom portion of the image data of each input page in combining the image data.

5. A communication apparatus according to claim 4, wherein said transmission means reads the margin image data from a memory in which the margin image data was pre-stored.

6. A communication apparatus according to claim 5, wherein said transmission means reduces or enlarges the pre-stored margin image data when a size of the image data of one input page after the addition of the margin image data is not equal to the area size so that the size of the input image data of the one input sage after the addition of the margin image data is equal to the area size.

7. A communication apparatus according to claim 5, wherein said transmission means adds less than all of the margin image data when a size of the input image data of the one input page after the addition of the prestored margin image data is larger than the area size so that the size of the input image data of the one input page is equal to the area size.

8. A communication apparatus according to claim 4, wherein said transmission means generates and adds the margin image data such that a size of the input image data of the one input page is equal to the area size.

9. A communication apparatus according to claim 1, wherein the image input means comprises image read means having a CCD scanner.

10. A communication apparatus according to claim 1, wherein said transmission means combines a plurality of input pages of input image data for transmission while varying main scan lengths thereof so that the main scan lengths match the main scan length of a first one of the input pages.

11. A communication apparatus according to claim 1, wherein said transmission means combines a plurality of input pages of input image data for transmission while varying main scan lengths thereof so that the main scan lengths match a longest main scan length of the input pages to be combined.

12. A communication apparatus according to claim 1, wherein said transmission means combines a plurality of input pages of input image data for transmission while varying main scan lengths thereof so that the main scan lengths match a longest main scan length of one communication of image data.

13. A communication apparatus according to claim 1, wherein said transmission means determines a reference main scan length of the image data which is a reference in combining the image data while varying main scan lengths thereof and adds margin data on the left and right of image data having a main scan length shorter than the reference main scan length.

14. A communication apparatus according to claim 13, wherein said transmission means reads and uses the margin image data from a memory in which the margin image data was pre-stored.

15. A communication apparatus according to claim 1, wherein said transmission means determines a reference main scan length of the image data which is a reference in combining the image data while varying main scan lengths thereof and reduces the image data having a longer main scan length than the reference main scan length.

16. A communication apparatus according to claim 1, wherein said first recognition means recognizes the input size of each input page based on a number of lines of the input image data of the respective input page.

17. A communication apparatus according to claim 1, wherein said communication apparatus is a facsimile apparatus.

18. An image communication apparatus comprising:
input means for inputting a plurality of input pages of image data;
detection means for detecting a respective input size of image data of each of the input pages;
recognition means for recognizing a record sheet size of a destination device;
combination means for subjecting each input page to a conversion operation to provide a respective size-converted page, the conversion operation comprising at least one of, for each input page for which the input size of the image data is different from the record sheet size, converting the input size to a converted size that matches the record sheet size and, for all input pages having image data of different sizes from each other, converting the input sizes so that all input pages have image data of a same converted size, said combination means further combining a plurality of the size-converted pages into one transmission page of image data; and
transmission means for transmitting the transmission page to the destination device.

19. A communication apparatus according to claim 18, further comprising memory means for storing the input pages of image data inputted by said input means.

20. A communication method comprising:
a first recognition step of recognizing an input size for each input page of a plurality of input pages of image data inputted by image input means, wherein the respective input sizes of at least two of the input pages are different from each other;
a second recognition step of recognizing a record sheet size of a record sheet at a transmission destination terminal; and
a transmission step of combining a plural number of the input pages into one transmission page of image data for transmission in accordance with the respective input sizes recognized in said first recognition step and the record sheet size recognized in said second recognition step, wherein the number of input pages to be combined includes at least two input pages having different input sizes,
said transmission step combining the number of input pages such that each of the number of input pages is recorded in a respective one of plural areas on a single record sheet, wherein an area size of each of the areas corresponds to a total record area determined by the record sheet size divided by the number of input pages to be combined.

21. An image communication method comprising:
an input step of inputting a plurality of input pages of image data;
a detection step of detecting a respective input size of image data of each of the input pages;
a recognition step of recognizing a record sheet size of a destination device;
a combination step of subjecting each input page to a conversion operation to provide a respective size-converted page, the conversion operation comprising at least one of, for each input page for which the input size of the image data is different from the record sheet size, converting the input size to a converted size that matches the record sheet size and, for all input pages having image data of different sizes from each other, converting the input sizes so that all input pages have image data of a same converted size, said combination step further combining a plurality of the size-converted pages into one transmission page of image data; and
transmission means for transmitting the transmission page to the destination device.

* * * * *

UNITED STATES PATENT AND TRADEMARK OFFICE
CERTIFICATE OF CORRECTION

PATENT NO. : 6,301,018 B1
DATED : October 9, 2001
INVENTOR(S) : Toru Maeda et al.

It is certified that error appears in the above-identified patent and that said Letters Patent is hereby corrected as shown below:

Drawings,
Sheet 3,
Figure 3, "TRASNSMIT" (both occurrences) should read -- TRANSMIT --.
Sheet 6,
Figure 6, "TRASNSMIT" (both occurrences) should read -- TRANSMIT --.

Column 1,
Line 21, "sheet" should read -- sheet. --.

Column 3,
Line 22, "exceeds" should be deleted.

Column 4,
Line 31, "explained" should read -- explained. --.

Column 7,
Line 28, "terminated" should read -- terminated. --.

Column 9,
Line 6, "sage" should read -- page --.

Signed and Sealed this

Thirtieth Day of April, 2002

*Attest:*

*Attesting Officer*

JAMES E. ROGAN
*Director of the United States Patent and Trademark Office*